Nov. 28, 1944. W. G. DIETER 2,363,578
CONTACTOR UNIT FOR AIR CONDITIONING SYSTEMS
Filed April 7, 1943 3 Sheets-Sheet 1

Inventor
WALTER G. DIETER.

By Frank Fraser
Attorney

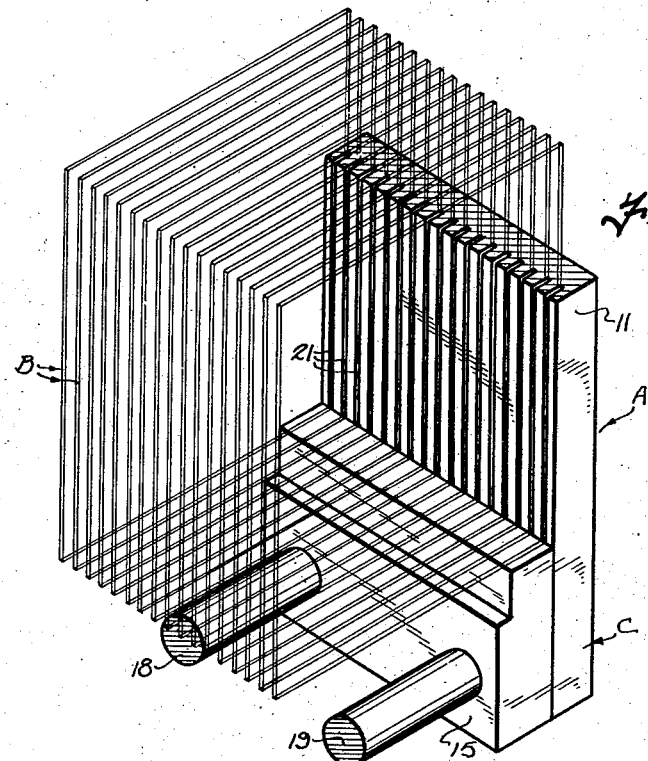
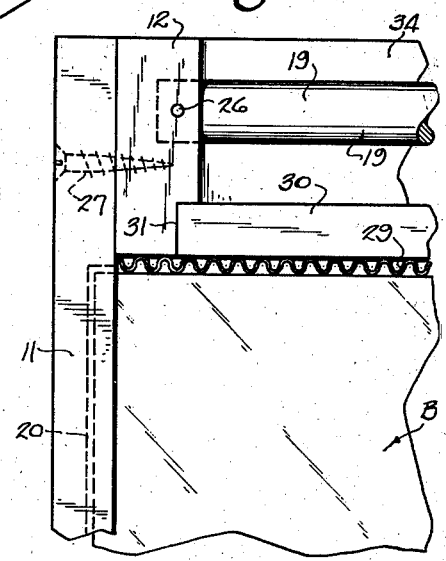

Nov. 28, 1944. W. G. DIETER 2,363,578
CONTACTOR UNIT FOR AIR CONDITIONING SYSTEMS
Filed April 7, 1943 3 Sheets-Sheet 3

Inventor
WALTER G. DIETER.
By Frank Fraser
Attorney

Patented Nov. 28, 1944

2,363,578

UNITED STATES PATENT OFFICE 2,363,578

CONTACTOR UNIT FOR AIR CONDITIONING SYSTEMS

Walter G. Dieter, Toledo, Ohio, assignor to Libbey-Owens-Ford Glass Company, Toledo, Ohio, a corporation of Ohio Application April 7, 1943, Serial No. 482,131

12 Claims. (Cl. 261—112)

The present invention relates broadly to air conditioning systems and more particularly to improvements in contactor units for such systems.

The contactor units of this invention find an important field of usefulness in connection with humidity control systems of the so-called chemical absorption type. That is, systems in which the moisture content of the atmosphere is controlled by bringing the air to be conditioned into contact with a material, and specifically a chemical liquid, having the ability to add moisture to, or remove it from the air during contact. The principle involved is similar to the common table salt test, where ordinary salt is exposed to a humid atmosphere and soon becomes wet and watery because it has absorbed moisture from the air.

Generally speaking, such systems involve the use of contactor cells, through which atmospheric air is passed and where it is washed by the chemical liquid to add or remove moisture as necessary; and a regenerator cell or cells, for reclaiming the chemical liquid by restoring it to its former condition after it leaves the contactor cells, so that it can be recirculated and used again and again.

In one system in which the contactor units of this invention have been successfully used in both the contactor and regenerator cells, a low vapor pressure salt solution which is essentially lithium chloride acts as the chemical absorption medium. In the contactor cells this lithium chloride solution is sprayed onto and flows continuously over specially designed contactor surfaces in such a manner that the moisture content of the atmospheric air being drawn between the contactor surfaces will be accurately controlled and without any of the solution being entrained in the air.

For example, when the air entering the contactor cell has a dry bulb temperature of 98° and a moisture content of 10 grains per cubic foot, and the system is so adjusted that conditioned air leaves the cell at 98° dry bulb and only 3 grains of moisture per cubic foot, the air passing through the cell will give up moisture to the lithium chloride solution at the rate of 63 gallons per hour.

There are two variables that govern the ability of the lithium chloride solution to absorb moisture. One is the temperature of the solution and the other is the solution strength. At constant strength, a low temperature solution will remove more moisture from the air than will a high temperature solution, and in most systems of this type it has been found desirable to maintain the same strength of solution and to vary the solution temperature in order to control the rate of moisture absorption.

Because of the moisture absorbed by the lithium chloride solution in the example just discussed, the solution continuously flowing over the contactor surfaces in the contactor cells will be more dilute than is the entering solution. To maintain the recirculated solution entering the contactor cells at constant strength, the excess moisture in the used solution must be continuously driven off, somewhere in the circuit, as rapidly as it is picked up in the contactor cells.

This is done, and all of the solution returned to normal strength before recirculating, by regenerating a portion of the solution leaving the contactor cells. For this purpose, a regenerator cell is used. The regenerator cell is similar in structure and operation to the contactor cell but performs an exactly opposite function. In other words, if moisture is absorbed from the air by the lithium chloride solution in the contactor cell, then an equivalent amount of moisture will be transferred from the solution to the outside air in the regenerator cell.

More specifically, a small amount is continuously bled off from the main stream of the solution passing from the contactor cells to a sump. This solution is first heated to reduce its capacity for absorbing or retaining moisture and then caused to flow over the contactor surfaces of a regenerator where it is brought into contact with a small stream of outside air. The heated solution is in a condition to give off moisture to the air rather than to absorb it and, by controlling the temperature of the solution, the exact amount of moisture desired will be removed by the air.

It is an important aim of the present invention to provide an improved contactor unit for systems of the above character and which will be equally suitable for use in both the contactor and regenerator cells.

Another object is the provision of a contactor unit made up of a plurality of non-corrosive louvers, together with a frame for freely supporting said louvers in vertical position and in spaced relationship to one another, which frame is open at opposite sides to permit the passage of air and liquid into contact with each of the louvers over their entire contactor surfaces.

Still another object is the provision of a unit of the above character, including glass louvers, which lends itself readily to the packaging and shipping of the complete unit assembly from the factory and eliminates the necessity for handling and mounting the individual louvers on the job.

Still another object is the provision of a contactor unit of this type which can be easily handled and will facilitate field assembly of the several units into the contactor or regenerator cells.

A further object is the provision of such a unit including a frame that can be boxed in and is adapted to form an integral part of a shipping package or crate.

Other objects and advantages of the invention will become more apparent during the course of the following description, when taken in connection with the accompanying drawings.

In the drawings, wherein like numerals are employed to designate like parts throughout the same:

Fig. 3 is a fragmentary, perspective view of one corner of a contactor unit;

Fig. 6 is a fragmentary, sectional view taken substantially on the line 6—6 of Fig. 5; and Fig. 7 is a vertical, sectional view taken substantially on the line 7—7 of Fig. 6 with one side of the crate removed.

Figure 1:
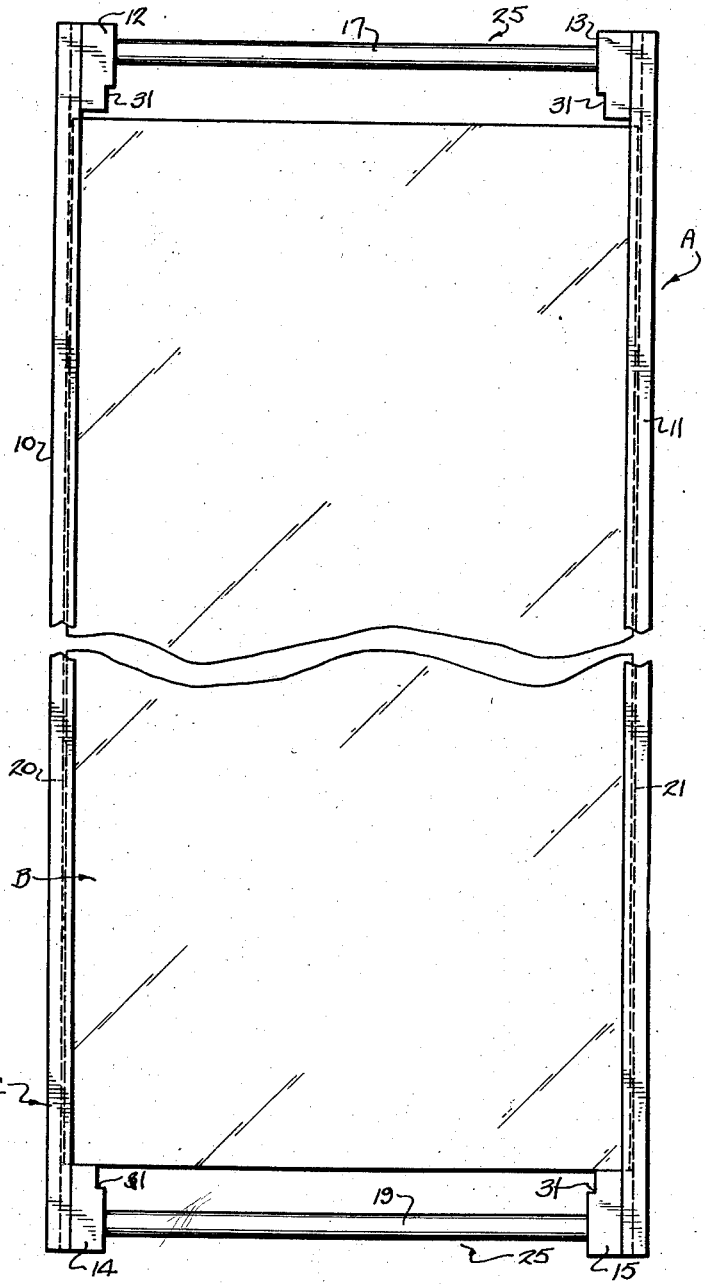
Fig. 1 is a side elevation of one of the contactor units.
Figure 2:
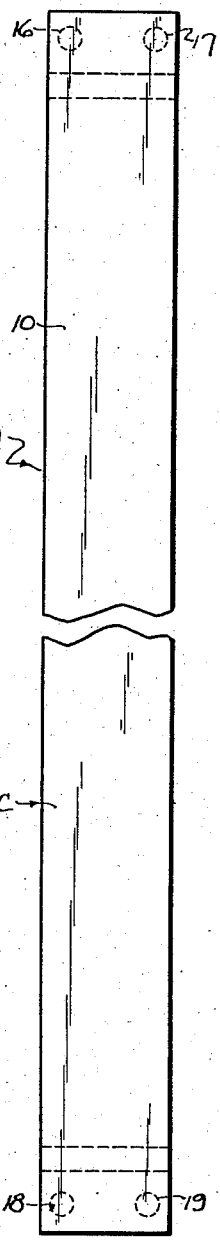
Fig. 2 is an end view of the unit shown in Fig. 1.

Referring now more particularly to the drawings, there is clearly illustrated in Figs. 1, 2 and 3 a preferred embodiment of the contactor unit of the invention, designated in its entirety by the letter A. As here shown, the unit A comprises, essentially, a plurality of glass louvers or contactor plates B freely supported in a substantially rectangular, skeleton framework C of wood.

Heretofore, contactor units of this type have been made up of a group of sheet steel louvers secured together by bolts, passing through the louvers at regularly spaced intervals throughout their surfaces, and spaced apart by washers or the like on the bolts. The difficulty with this sort of unit is that it is heavy, hard to handle in the field, and subject to corrosion from the chemical liquid used, which necessitates troublesome and costly replacements. In addition, the bolts and spacers interrupt and divert the free flow of liquid over the contactor surfaces resulting in bare spots alternating with relatively heavy streams of solution at intervals across the faces of the louvers.

In the unit of this invention, however, the glass louvers are non-corrosive and, since they are supported at their edges and corners only, each louver provides what amounts to an uninterrupted contact surface on both sides. This insures a uniform sheet of liquid flowing over the plates and makes for maximum efficiency for the available contact area.

As illustrated in the drawings, the rectangular frame C comprises a pair of oppositely disposed grooved end boards or members 10 and 11 secured to corner blocks 12, 13 and 14, 15 respectively at their upper and lower ends. The frame is completed without closing its top and bottom by means of rods 16, 17 and 18, 19 connecting upper blocks 12, 13 and lower blocks 14, 15 respectively.

In use, the frame C is in an upright position as shown, with the louvers B freely supported upon the two lower corner blocks 14 and 15 and held in spaced parallel relation to one another by the grooves 20 and 21 in the members 10 and 11, within which opposite side edges of the louvers B are received. As indicated above, the frame C is preferably, although not necessarily, of wood and is suitably treated to render it waterproof and permanent. Nevertheless, the grooves 20 and 21 are made somewhat larger than the thickness of the glass sheets to allow for any possible swelling and warpage of the wood.

For the louvers themselves, it has been found that so-called picture glass of a thickness of about .043 inch to .053 inch and weighing approximately 9 to 11 ounces per square foot is the most satisfactory for the purpose. This glass is relatively cheap and light in weight but when mounted in the special frame C of the invention is surprisingly free from breakage even when freely handled by regular workmen during packaging, shipping, and installation.

Figures 4, 5:
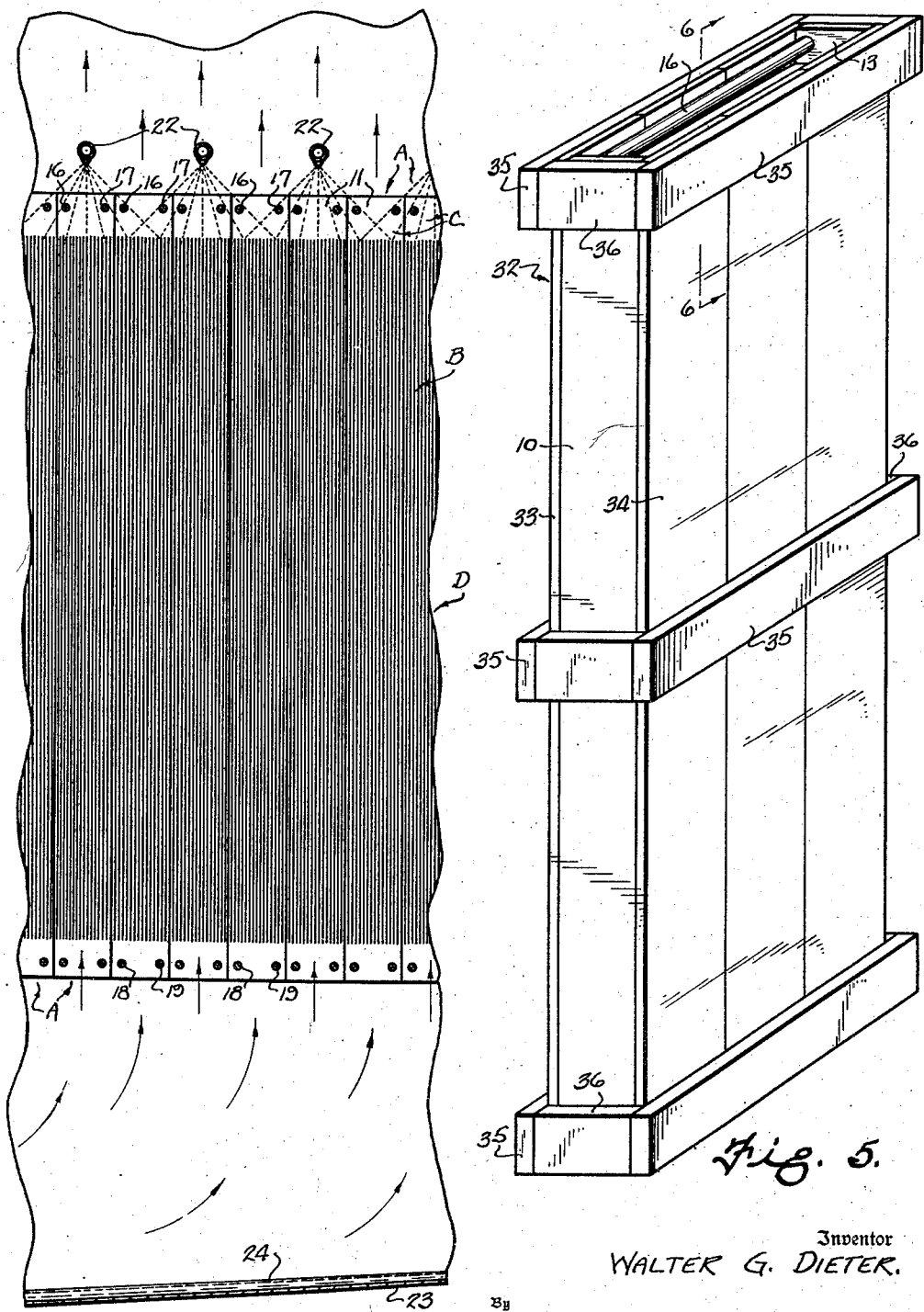
Fig. 4 is a fragmentary vertical sectional view through the contactor cell of a humidity control system showing a number of the units of the invention in operative position.
Fig. 5 is a perspective view of one of the contactor units crated for shipment.

In Fig. 4 there is shown a typical installation of a number of the contactor units A in a contactor cell D. A chemical liquid, such as a lithium chloride solution, is sprayed from spray heads 22 through the open tops of the contactor units A onto the upper edges of the glass louvers B. The liquid then flows in a continuous sheet-like wash down the faces of the louvers until it reaches their lower edges. From the louvers B the liquid drops into a ditch or channel 23 leading to a sump (not shown).

While the lithium chloride solution is flowing continuously over the contactor faces of the louvers B, air to be conditioned is drawn upwardly through the cell D, in the direction of the arrows, by a centrifugal pump or the like (not shown). As the air passes between the louvers B, and in contact with the solution flowing over the contactor faces, moisture will be transferred from the air to the solution or from the solution to the air, depending upon the setting of the controls in the system, so that the air emerging from the top of the cells D will have a predetermined moisture content. The conditioned air will also be relatively free from dust and odors as a result of the chemical wash.

A small amount of the liquid from the stream 24, flowing through the channel 23, is by-passed to the regenerator (not shown), where it is treated before being returned, with the rest of the liquid, to the sump from which it is recirculated through the system.

It will be noted by reference to Fig. 4 that the rods 16 and 17 connecting the upper corner blocks 12 and 13 of the units A are so arranged that, when the spray heads 22 are properly positioned relative thereto, the lithium chloride solution can be sprayed onto the edges of each and every one of the louvers B without interference from the rods 16 and 17. This can be done when a single series or row of spray heads 23 supplies liquid to two or more contactor units as shown, or when one row of spray heads is provided for each unit A. In the latter case, the spray heads 22 can be so arranged that the spray of liquid is entirely between and below the pair of rods 16 and 17 of each unit and yet the upper edge of each louver B in the unit will be sprayed with liquid.

Fig. 4 also shows how the contactor cell D is made up of a number of units A arranged face to face to form, in effect, a succession of vertical louvers in parallel spaced relationship, extending from one side of the cell to the other. In one installation, approximately 100 louvers spaced four to the inch were required for each cell and it will be apparent that a greater or less number of louvers can be supplied by varying the number of contactor units used in each cell.

The contactor unit illustrated in the drawings is especially designed for the so-called countercurrent type of cell, where the liquid solution is sprayed in at the top and the air is drawn in from the bottom. With this type of cell, the top and bottom of the contactor units must be open but the ends at the vertical edges of the louvers can be closed. However, the present construction can also be readily adapted to the cross flow type of cell, where all four sides of the frame C must be open, by simply cutting out the middle portion of the grooved members 10 and 11 so that they will engage the louvers B only at their corners, and then connecting these grooved members by vertical rods or the like in the same way as the corner blocks 12, 13 and 14, 15 at the top and bottom of the units are connected.

Probably one of the principal advantages of the present construction is the fact that the units can be completely assembled at the factory and then efficiently packed and crated, with the frame serving as an important and substantial part of the crate. In other words, no part of the assembly of the unit has to be done on the job. Indeed, only the packing and a part of the crating need be removed when the unit A is received from the factory, in order to place it in readiness to be slipped into its place in the contactor cell D.

Before assembling the unit A, sections 25, consisting of a pair of corner blocks connected together by a pair of rods or dowels, are first made up. This is done by setting the opposite ends of the dowels into cylindrical openings in the faces of the corner blocks with waterproof glue and permanently holding them in place by dowel pins 26 (Figs. 6 and 7).

In assembling one of the contactor units A, one of the preformed assemblies or sections 25 is secured to the ends of the end boards or members 10 and 11 by aligning pre-drilled holes in the corner blocks and end members, and then secured in place by means of wood screws or the like 27 (Fig. 7). This three-sided frame is then stood on end, in an upright position, resting on the section 25. The glass louvers can now be easily placed in proper position in the unit by inserting their vertical edges into the grooves 21 of the members 10 and 11. At the same time, corrugated cardboard packing sheets are inserted between the glass sheets B as indicated at 28 in Fig. 6. With all the louvers B in place, the opposite end sections 25 is positioned in place at the top of the vertical assembly between the opposite ends of members 10 and 11, the previously drilled screw holes in blocks 12 and 13 aligned with those in members 10 and 11, then the respective members secured in place with additional wood screws 27.

The unit A is next stood upright on one end (Figs. 1 and 2) and a layer of corrugated paper or board 29 (Figs. 6 and 7) is placed across the top edges of the glass sheets B and a wood insert 30 positioned above the paper and fitted snugly into grooves 31 in the corner blocks 12 and 13 which have been rabbeted for this purpose. After this, the unit is turned upside down and a similar operation performed on the opposite end.

The glass louvers of the unit have now been properly packed, with corrugated cardboard at the top and bottom and between each sheet, and the ends of the units closed by the wood inserts 30. The next move is to complete the crating of the unit. As brought out above, the end boards 10 and 11 form two sides of a crate 32 (Fig. 5) and the wood inserts 30 will provide the closures for the top and bottom. It is therefore only necessary to enclose the front and back faces of the units and this can be readily done, after covering the outer sheets with corrugated cardboard, by means of panels 33 and 34 provided with the braces or cross bars 35. Each of these braces 35 are of sufficient length to extend out past the end boards 10 and 11 a distance equal to the widths of the braces, so that the panels 33 and 34 can be connected to one another and secured in place on the unit by nailing or otherwise securing the cross bars 35 to cooperating connecting braces 36 extending across the end boards 10 and 11.

It will be seen that the construction of the contactor unit itself greatly facilitates the assembly, packing and crating of the unit with a minimum amount of labor and materials and in a manner to minimize breakage of the glass louvers. Further, when the crated unit arrives on the job, it can be readily handled either manually or by a crane or the like by means of the rods 16, 17 and 18, 19 which have been purposely left exposed for this purpose (Fig. 5). And in order to prepare the crated unit for installation in the contactor cell, it is only necessary to remove the panels 33 and 34, the wood inserts 30, and the corrugated paper packing 29 and 28 from above and between the glass louvers. It is preferred that the corrugated cardboard packing used between the glass sheets or louvers be of the single-faced variety in order to facilitate its removal, since certain of the corrugated sheets 28 will have to be bent around the rods 16, 17 or 18, 19 when they are taken out.

As already indicated, the contactor units A here described, are adaptable for use in either the contactor or regenerator cells of air conditioning systems. However, the temperature conditions in the regenerator cells of some installations are such as to produce a rather severe thermal shock to the glass louvers. For example, the adjustment in one set-up in which these units are used provides for a liquid solution being sprayed into the top of the cell at a temperature of 240° F. and flowing out of the bottom of the unit at 140° F. At the same time, air is being drawn into the bottom of the unit at 40° F. and out of the top at 140° F. With this and similar conditions, it may be necessary or desirable to supply heat treated glass sheets and perhaps sheets of somewhat greater thickness than the picture glass described above.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. In an air conditioning system a contactor unit comprising a plurality of spaced contactor plates and a frame extending around and parallel with the edges of said plates for supporting and retaining the same adjacent their edges and providing a substantially uninterrupted contactor surface on both faces of each of the contactor plates, said frame being open on two sides to permit free passage of air and liquid into and out of contact with two edges of each contactor plate.

2. In an air conditioning system, a contactor unit comprising a plurality of spaced glass contactor plates and a frame extending around and parallel with the edges of said plates for supporting and retaining the same adjacent their edges only and providing a substantially uninterrupted contactor surface on both faces of each contactor plate, said frame being open on two opposing sides to permit free passage of air and liquid into and out of contact with two opposite edges of each glass contactor plate.

3. In an air conditioning system, a contactor unit comprising a plurality of glass contactor plates and a frame extending around and parallel with the edges of said plates for supporting and retaining the same in spaced relation to one another, said frame having one side open to permit liquid to be sprayed onto the edges of said contactor plates and the opposite side open to permit air to be drawn between the contactor plates.

4. In an air conditioning system, a contactor unit comprising a plurality of glass contactor plates and a frame extending around and parallel with the edges of said plates for supporting and retaining the same in vertical position and in spaced, parallel relationship to one another, said frame having two opposing sides which are provided with plate engaging means and two opposing sides which are open to permit the passage of liquid and air therethrough and into contact with the edges of said contactor plates.

5. A contactor unit for the cells of dehumidifying cabinets comprising a plurality of contactor plates, a frame extending around and parallel with the edges of said plates for supporting and retaining the same in spaced, parallel relationship to one another, said frame including means engageable with the edges of the contactor plates adjacent their four corners, and means connecting said engageable means and forming the sides of the frame, two of said sides being open to permit the passage of liquid and air therethrough and into contact with the edges of the contactor plates.

6. A contactor unit for the cells of dehumidifying cabinets comprising a plurality of glass contactor plates, a frame extending around and parallel with the edges of said plates for supporting and retaining the same in vertical spaced, parallel relationship to one another, said frame including four sides, each of which is provided with portions engageable with one edge of the contactor plates and two of said sides being open to permit passage of liquid and air therethrough and into contact with the edges of the contactor plates.

7. A contactor unit for the cells of dehumidifying cabinets comprising a plurality of glass contactor plates and a four-sided frame extending around and parallel with the edges of said plates for supporting and retaining the same in spaced, parallel relationship to one another, said frame having two sides formed by members slotted to receive the edges of the glass contactor plates and two sides formed by connecting means for said slotted members, said connecting means including a pair of spaced rods.

8. A contactor unit for the cells of dehumidifying cabinets comprising a plurality of glass contactor plates and a four-sided frame extending around and parallel with the edges of said plates for supporting and retaining the same in spaced, parallel relationship to one another, said frame having two sides formed by members slotted to receive the edges of the glass contactor plates and two sides formed by corner blocks secured to the slotted members and rods connecting said corner blocks.

9. A contactor unit for the cells of air conditioning systems, comprising a plurality of glass contactor plates and a frame extending around and parallel with the edges of said plates for supporting and retaining the same in spaced, parallel relation, said frame including two solid grooved sides for receiving the edges of the glass contactor plates and two open sides, said open sides being formed to receive a solid closure member between themselves and the adjacent edges of the glass contactor plates, and said solid sides being so arranged relative to said open sides that when faced with crating panels after the open sides have been closed they will form a complete shipping container.

10. A contactor unit for the cells of air conditioning systems, comprising a plurality of glass contactor plates, and a four-sided frame extending around and parallel with the edges of said plates for supporting and retaining the same in spaced parallel relation, at least two sides of said frame being open and formed to receive a closure member between themselves and the adjacent glass edges and all four sides being so arranged relative to one another that when faced with crating panels and with the open sides closed they will form a complete shipping container.

11. A contactor unit for the cells of air conditioning systems, comprising a plurality of glass contactor plates, and a four-sided frame extending around and parallel with the edges of said plates for supporting and retaining the same in spaced, parallel relation, two sides of said frame being formed by solid members slotted to receive the edges of the glass contactor plates and the other two sides being formed by corner blocks secured to the slotted members and rods connecting the corner blocks, said corner blocks being positioned to receive a solid closure member between themselves and the adjacent edges of the glass contactor plates with the connecting rods outside the closure member, and all four sides of the frame being so arranged relative to one another that with the solid closure members in place and when faced with crating panels they will form a complete shipping container.

12. A contactor unit for the cells of air conditioning systems, comprising a plurality of glass contactor plates, and a four-sided frame extending around and parallel with the edges of said plates for supporting and retaining the same in spaced, parallel relation, two sides of said frame being formed by solid members slotted to receive the edges of the glass contactor plates and the other two sides being formed by corner blocks secured to the slotted members and rods connecting the corner blocks, said corner blocks being rabbeted at their inner faces to receive a closure member, and all four sides being so arranged relative to one another that with the closure members received and when faced with crating panels they will form a completely enclosed shipping container with said connecting rods accessible from the outside.

WALTER G. DIETER.